(12) United States Patent
Lee et al.

(10) Patent No.: US 8,060,526 B2
(45) Date of Patent: Nov. 15, 2011

(54) METHOD FOR PROVIDING REQUESTED FIELDS BY GET_DATA OPERATION IN TV-ANYTIME METADATA SERVICE

(75) Inventors: Jong Seul Lee, Sungnam (KR); Seok Pil Lee, Sungnam (KR); Tae Beom Lim, Anyang (KR); Kyoung Ro Yoon, Seoul (KR)

(73) Assignee: Korea Electronics Technology Institute, Kyunggi-Do (KR)

( * ) Notice: Subject to any disclaimer, the term of this patent is extended or adjusted under 35 U.S.C. 154(b) by 0 days.

(21) Appl. No.: 13/014,098

(22) Filed: Jan. 26, 2011

(65) Prior Publication Data

US 2011/0119301 A1 May 19, 2011

Related U.S. Application Data

(62) Division of application No. 11/192,057, filed on Jul. 29, 2005, now Pat. No. 7,917,529.

(30) Foreign Application Priority Data

Sep. 17, 2004 (KR) .................. 10-2004-0074548
Mar. 29, 2005 (KR) .................. 10-2005-0025885

(51) Int. Cl.
*G06F 7/00* (2006.01)
(52) U.S. Cl. ............................. 707/769; 725/135; 725/53
(58) Field of Classification Search .................. None
See application file for complete search history.

(56) References Cited

U.S. PATENT DOCUMENTS

| 7,103,357 B2 * | 9/2006 | Kirani et al. ............... 455/426.1 |
| 7,461,077 B1 | 12/2008 | Greenwood |
| 7,526,425 B2 | 4/2009 | Marchisio et al. |

| 2003/0200531 A1 | 10/2003 | Fairweather |
| 2004/0054541 A1 | 3/2004 | Kryze et al. |
| 2004/0184078 A1 | 9/2004 | Endo et al. |

(Continued)

FOREIGN PATENT DOCUMENTS

EP  1536349  6/2005

(Continued)

OTHER PUBLICATIONS

ETSI Technical Specification, Broadcast and On-line Services: Search, select, and rightful use of content on personal storage systems ETSI TS 102 822-6-1 V1.1.1, Oct. 2003 pp. 1-59.

(Continued)

*Primary Examiner* — Neveen Abel Jalil
*Assistant Examiner* — Kellye Buckingham
(74) *Attorney, Agent, or Firm* — Sughrue Mion, PLLC

(57) ABSTRACT

Disclosed is a method or an operation for providing a personalized TV-Anytime metadata service. According to an embodiment of the present invention, there is provided a method of providing a table field element using a get_Data operation in the TV-Anytime metadata service. In the table field element provision method, a requested fields type element (RequestedFieldsType) required to designate a field of a metadata table is included in a query result value type in the SOAP query operation. A request message of the SOAP query operation is received. When the request message includes the requested fields type element for designating the query result value, a query result value corresponding to the table field designated from the requested fields type element included in the request message is extracted, and the query result value is transmitted using a response message of the SOAP operation.

4 Claims, 11 Drawing Sheets

U.S. PATENT DOCUMENTS

| | | | |
|---|---|---|---|
| 2004/0208480 A1 | 10/2004 | Yoon et al. | |
| 2004/0210572 A1* | 10/2004 | Shin | 707/3 |
| 2005/0060372 A1 | 3/2005 | DeBettencourt et al. | |
| 2005/0131917 A1 | 6/2005 | Auerbach | |
| 2005/0144285 A1* | 6/2005 | Hickman | 709/227 |
| 2005/0165748 A1 | 7/2005 | Ting et al. | |
| 2006/0179138 A1 | 8/2006 | Van Gassel et al. | |

FOREIGN PATENT DOCUMENTS

| | | |
|---|---|---|
| WO | WO 03/077558 A2 | 9/2003 |
| WO | WO 03091829 A2 | 11/2003 |
| WO | 2004/010334 A1 | 1/2004 |
| WO | 2004/023341 | 3/2004 |

OTHER PUBLICATIONS

"Dynamic Digital Libray Construction and Configuration" David Bainbride et al. 2004; http://www.springerlink.com/content/wat3u9qhtqycdxq4/fulltext.pdf.

"Media Augmenttion and Personalization Through Multimedia Processing and Information Extraction", L. Ardissono et al., Personalized Digtal Television, p. 203-233, 2004; http://www.springerlink.com/content/r64x105622u12334/fulltext.pdf.

"TV-Anytime Phase 1—a decisive milestone in open standards for Personal Video Recorders", Jean-Pierre Evan et al., EBU Technical Review—Jul. 2003, 1-11. http://www.ebu.ch/en/technical/trev/trev_295-evain.pdf.

Extensible Markup Language (XML) 1.0 (Second Edition), W3C Recommendation, Oct. 6, 2000. Editors: Bray, Paoli, Sperberg-McQueen and Maler. http://www.w3.org/TR/2000/REC-xml-20001006.

Namespaces in XML, W3C Recommendation, Jan. 14, 1999. Editors: Bray, Hollander and Layman. http://www.w3.org/TR/1999/REC-xml-names-19990114.

Request for Comments: 1591. Domain Name System Structure and Delegation, J. Postel, Mar. 1994. http://www.ietf.org/rfc/rfc1591.txt.

Request for Comments: 1945. Hypertext Transfer Protocol—HTTP/1.0. Berners-Lee et al., May 1996. http://www.ietf.org/rfc/rfc1945.txt.

Request for Comments: 2119. Key words for use in RFCs to Indicate Requirement Levels. S. Bradner, Mar. 1997. http://www.ietf.org/rfc/rfc2119.txt.

Request for Comments: 2396. Uniform Resource Identifiers (URI): Generic Syntax. Berners-Lee et al., Aug. 1998. http://www.ietf.org/rfc/rfc2396.txt.

Request for Comments: 2616. Hypertext Transfer Protocol—HTTP/1.1. Fielding et al., Jun. 1999. http://www.ietf.org/rfc/rfc2616.txt.

Requirements and Scenarios for the Bi-directional Transport of Metadata, TV150r1, The TV-Anytime Forum. http://www.tv-anytime.org.

Simple Object Access Protocol (SOAP) 1.1, W3C Note, May 8, 2000. Authors: Box, Ehnebuske, Kakivaya, Layman, Mendelsohn, Nielsen, Thatte, and Winer. http://www.w3.org/TR/2000/NOTE-SOAP-20000508.

The Platform for Privacy Preferences 1.0 (P3P1.0) Specification. Editor: Marchiori. Apr. 16, 2002. http://www.w3.org/TR/P3P/.

The WS-Inspection and UDDI Relationship. Authors: Nagy and Ballinger, Nov. 1, 2001. http://www-106.ibm.com/developerworks/webservices/library/ws-wsiluddi.html.

TV-Anytime Requirements Series: R-1, TV035r6, The TV-Anytime Forum. http://www.tv-anytime.org.

TV-Anytime Specification on Content Referencing, SP004v12. Final Specification, Version 1.2. The TV-Anytime Forum. http://www.tv-anytime.org.

TV-Anytime Specification on Metadata Protection, SP007v10. Final Specification, Version 1.0. The TV-Anytime Forum. http://www.tv-anytime.org.

TV-Anytime Specification on Metadata, SP003v13. Final Specification, Version 1.3. The TV-Anytime Forum. http://www.tv-anytime.org.

TV-Anytime Specification on System, SP002v13. Final Specification, Version 1.3. The TV-Anytime Forum. http://www.tv-anytime.org.

Unicode Collation Algorithm, Unicode Technical Standard #10. Authors: Davis and Whistler. May 5, 2005. http://www.unicode.org/unicode/reports/tr10.

Unicode Normalization Forms, Unicode Standard Annex #15. Authors: David and Dürst. Mar. 25, 2005. http://www.unicode.org/unicode/reports/tr15.

Universal Description Discovery & Integration, Version 3.0. Authors: Bellwood, Clément, Ehnebuske, Hately, Hondo, Husband, Januszewski, Lee, McKee, Munter and von Riegen. Jul. 19, 2002. http://uddi.org/pubs/uddi-v.3.00-published-20020719.htm.

Web Services Description Language (WSDL), Version 1.1, W3C Note, Mar. 15, 2001. http://www.w3.org/TR/2001/NOTE-wsdl-20010315.

Web Services Inspection Language, Version 1.0. Authors: Ballinger, Brittenham, Malhotra, Nagy, and Pharies. Nov. 2001. http://www.ibm.com/developerworks/webservices/library/ws-wsilspec.html.

XML Schema, W3C Recommendation (Version 1.0). May 2, 2002. http://www.w3.org/TR/2001/REC-xmlschema-0-20010502, http://www.w3.org/TR/2001/REC-xmlschema-1-20010502, http://www.w3.org/TR/2001/REC-xmlschema-2-20010502.

* cited by examiner

[FIG. 1]
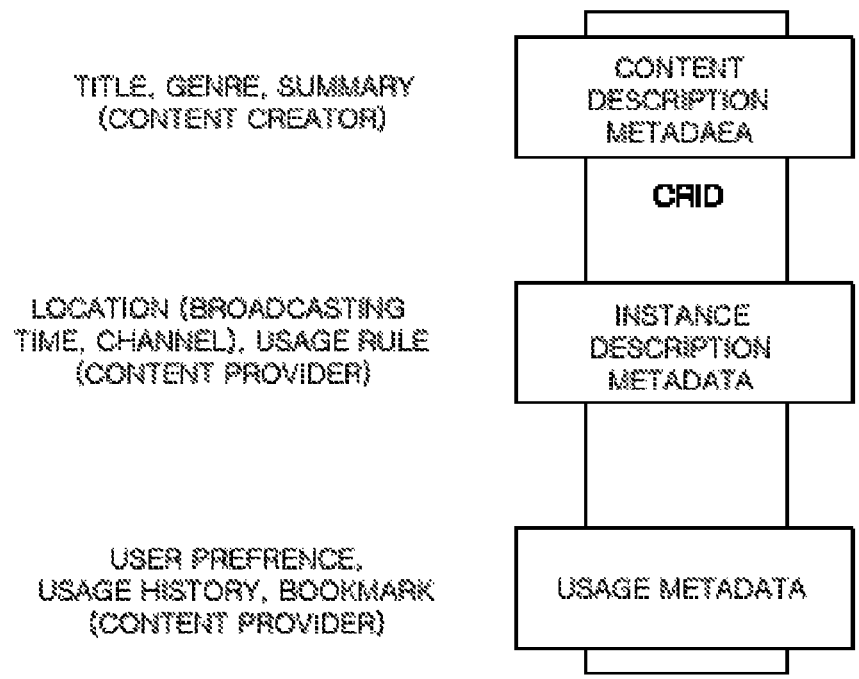
[FIG. 2]
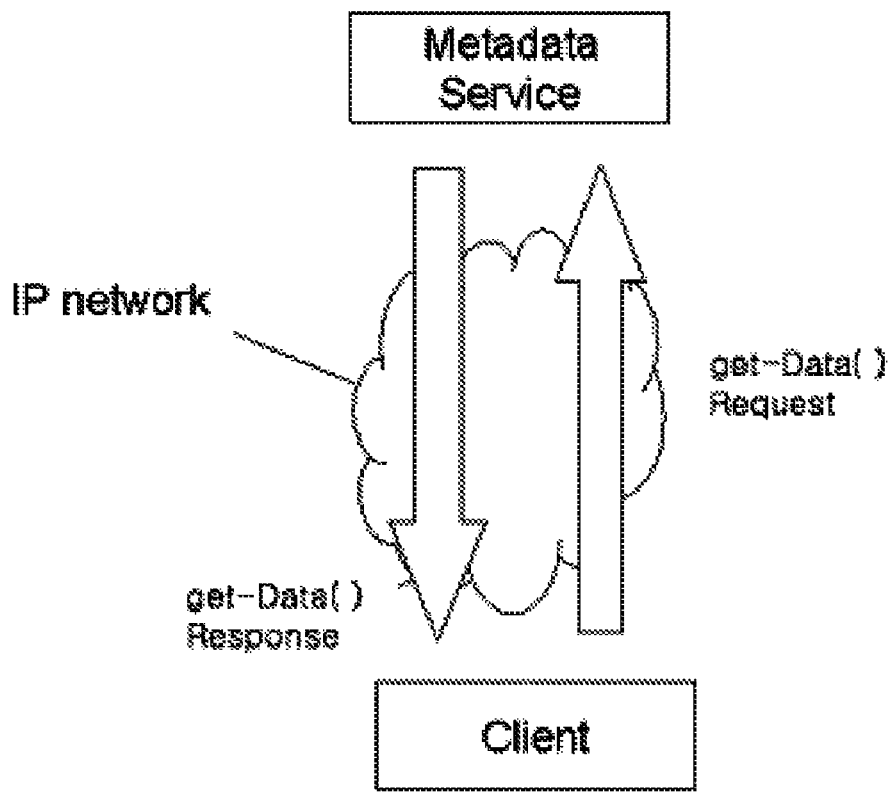

[FIG. 3]

```
<element name="get_Data" type="tns:get_Data"/>
  <complexType name="get_Data">
    <sequence>
      <element name="QueryConstraints">
        <complexType>
          <choice>
            <element name="PredicateBag" type="tns:PredicateBagType"/>
            <element name="BinaryPredicate" type="tns:BinaryPredicateType"/>
            <element name="UnaryPredicate" type="tns:UnaryPredicateType"/>
          </choice>
        </complexType>
      </element>
      <element name="RequestedTables" type="tns:RequestedTablesType"/>
    </sequence>
    <attribute name="maxPrograms" type="unsignedInt"/>
  </complexType>
```

[FIG. 4]

```
<element name="get_Data" type="tns:get_Data"/>
  <complexType name="get_Data">
    <sequence>
      <element name="QueryConstraints">
        <complexType>
          <choice>
            <element name="PredicateBag" type="tns:PredicateBagType"/>
            <element name="BinaryPredicate" type="tns:BinaryPredicateType"/>
            <element name="UnaryPredicate" type="tns:UnaryPredicateType"/>
          </choice>
        </complexType>
      </element>
      <element name="RequestedTables" type="tns:RequestedTablesType"/>
    </sequence>
    <attribute name="maxPrograms" type="unsignedInt"/>
  </complexType>

<complexType name="RequestedTablesType">
    <sequence>
      <element name="Table" maxOccurs="unbounded">
        <complexType>
          <sequence>
<element name="SortCriteria" type="tns:SortCriteriaType" minOccurs="0" maxOccurs="unbounded"/>
          </sequence>
          <attribute name="type" use="required" >
            <simpleType>
<restriction base="string">
<enumeration value="ContentReferencingTable"/>
<enumeration value="ClassificationSchemeTable"/>
<enumeration value="ProgramInformationTable"/>
<enumeration value="GroupInformationTable"/>
<enumeration value="CreditsInformationTable"/>
<enumeration value="ProgramLocationTable"/>
<enumeration value="ServiceInformationTable"/>
<enumeration value="ProgramReviewTable"/>
<enumeration value="SegmentInformationTable"/>
</restriction>
            </simpleType>
          </attribute>
        </complexType>
      </element>
    </sequence>
  </complexType>
```

[FIG. 5]

```
<element name="get_Data_Result" type="tns:get_Data_ResultType"/>
  <complexType name="get_Data_ResultType">
    <sequence>
      <element name="TableSortingInformation"
            type="tns:RequestedTablesType" minOccurs="0"/>
      <element ref="tva:TVAMain" minOccurs="0"/>
      <element ref="cr:ContentReferencingTable" minOccurs="0"/>
      <element name="InvalidFragments"
            type="tns:InvalidFragmentsType" minOccurs="0"/>
    </sequence>
    <attribute name="serviceVersion" type="unsignedInt" use="required"/>
    <attribute name="truncated" type="boolean"/>
```

[FIG. 6]

```
<complexType name="RequestedFieldsType">
  <sequence>
    <element name="RequestedField" minOccurs="0"
maxOccurs="unbounded">
      <complexType>
        <sequence>
          <element name="SortCriteria" type="tns:SortCriteriaType"
minOccurs="0" maxOccurs="unbounded"/>
        </sequence>
          <attribute name="fieldID" type="tns:fieldIDType"
use="required"/>
      </complexType>
    </element>

<element name="RequestedXPath" minOccurs="0"
maxOccurs="unbounded">
      <complexType>
        <sequence>
          <element name="SortCriteria" type="tns:SortCriteriaType"
minOccurs="0"   maxOccurs="unbounded"/>
        </sequence>
```

[FIG. 7]

```
<element name="get_Data" type="tns:get_Data"/>
  <complexType name="get_Data">
    <sequence>
      <element name="QueryConstraints">
        <complexType>
          <choice>
            <element name="PredicateBag" type="tns:PredicateBagType"/>
            <element name="BinaryPredicate" type="tns:BinaryPredicateType"/>
            <element name="UnaryPredicate" type="tns:UnaryPredicateType"/>
          </choice>
        </complexType>
      </element>

<element name="RequestedTables" type="tns:RequestedTablesType" minOccurs="0" maxOccurs="unbounded"/>
      <element name="RequestedFields" type="tns:RequestedFieldsType" minOccurs="0" maxOccurs="unbounded"/>

</sequence>
    <attribute name="maxPrograms" type="unsignedInt"/>
  </complexType>
```

[FIG. 8]

```
<?xml version="1.0" encoding="UTF-8"?>
<tns:get_Data xmlns:tns="urn:tva:transport:2002"
xmlns:cr="http://www.tv-anytime.org/2002/06/ContentReferencing"
xmlns:mpeg7="urn:mpeg:mpeg7:schema:2001"
xmlns:p3p="http://www.w3.org/2002/01/P3Pv1"
xmlns:rar="http://www.tv-anytime.org/2002/06/ResolvingAuthority"
xmlns:tva="urn:tva:metadata:2002"
xmlns:xsi="http://www.w3.org/2001/XMLSchema-instance"
xsi:schemaLocation="urn:tva:transport:2002 tva_transport_types_v10.xsd">

<tns:QueryConstraints>
  <tns:PredicateBag type="OR">
   <tns:BinaryPredicate fieldID="tvaf:ServiceURL" fieldValue="tv://7"/>
   <tns:BinaryPredicate fieldID="tvaf:ServiceURL" fieldValue="tv://9"/>
  </tns:PredicateBag>
 </tns:QueryConstraints>
 <tns:RequestedTables>
  <tns:Table type="ProgramLocationTable"/>
 </tns:RequestedTables>
 <tns:RequestedFields>
  <tns:RequestedField fieldID="tvaf:CRID"/>
  <tns:RequestedField fieldID="tvaf:Genre"/>
  <tns:RequestedField fieldID="tvaf:Title"/>
  <tns:RequestedField fieldID="tvaf:ProgramURL"/>
  <tns:RequestedField fieldID="tvaf:PublishedStart"/>
```

[FIG. 9a]

```
<?xml version="1.0" encoding="UTF-8"?>
<tns:get_Data_Result xmlns:tns="urn:tva:transport:2002"
 xmlns:cr=http://www.tv-anytime.org/2002/06/ContentReferencing
xmlns:mpeg7="urn:mpeg:mpeg7:schema:2001"
xmlns:p3p=http://www.w3.org/2002/01/P3Pv1
xmlns:rar="http://www.tv-anytime.org/2002/06/ResolvingAuthority"
xmlns:tva="urn:tva:metadata:2002"
xmlns:xsi="http://www.w3.org/2001/XMLSchema-instance"
xsi:schemaLocation="urn:tva:transport:2002
F:\Doc\WORKINDOC\Project\metadata_definition\sp006test\tva_transport_types_v10.xsd" serviceVersion="1"
truncated="false">

<tns:TableSortingInformation>
<tns:Table type="ProgramLocationTable">
<tns:SortCriteria fieldID="tvaf:CRID"/>
    </tns:Table>
    <tns:Table type="ProgramInformationTable">
        <tns:SortCriteria fieldID="tvaf:CRID"/>
      </tns:Table>
    </tns:TableSortingInformation>
<tva:TVAMain>
<tva:ProgramDescription>
<tva:ProgramInformationTable>
<tva:ProgramInformation programId="CRID://www.kbs.co.kr:cultural/specialreport_7">
        <tva:BasicDescription>
            <tva:Title>Middle East</tva:Title>
<tva:Genre href="urn:tva:metadata:cs:ContentCS:2002" type="main">
              <tva:Name>Cultural</tva:Name>
</tva:Genre>
              <tva:Genre href="urn:tva:metadata:cs:ContentCS:2002" type="secondary">
                 <tva:Name>Local/regional</tva:Name>
              </tva:Genre>
          </tva:BasicDescription>
        </tva:ProgramInformation>
```

[FIG. 9b]

```
<tva:ProgramInformation programId="CRID://www.keti.re.kr:drama/wanggun">
                    <tva:BasicDescription>
                            <tva:Title>King Wanggun</tva:Title>
                            <tva:Genre
href="urn:tva:metadata:cs:ContentCS:2002" type="main">
                                    <tva:Name>FICTION</tva:Name>
                            </tva:Genre>
                            <tva:Genre
href="urn:tva:metadata:cs:ContentCS:2002" type="secondary">
                                    <tva:Name>HISTORICAL/EPIC</tva:Name>
                            </tva:Genre>
                    </tva:BasicDescription>
            </tva:ProgramInformation>
        </tva:ProgramInformationTable>
        <tva:ProgramLocationTable>
           <tva:BroadcastEvent serviceIDRef="9">
                            <tva:Program
crid="CRID://www.kbs.co.kr:cultural/specialreport_7"/>
                            <tva:ProgramURL>ftp://203.253.130.21/images/230x158/news9.tar</tva:ProgramURL>
                            <tva:PublishedStartTime>2004-09-07T11:00:00.00+09:00</tva:PublishedStartTime>
                            <tva:PublishedDuration>PT55M</tva:PublishedDuration>
                    </tva:BroadcastEvent>
            <tva:BroadcastEvent serviceIDRef="9">
                            <tva:Program
crid="CRID://www.keti.re.kr:drama/wanggun"/>
                            <tva:ProgramURL>ftp://203.253.130.21/images/230x158/wanggun.tar</tva:ProgramURL>
                            <tva:PublishedStartTime>2003-10-20T21:00:00.00+09:00</tva:PublishedStartTime>
                            <tva:PublishedDuration>PT9M23S</tva:PublishedDuration>
                    </tva:BroadcastEvent>
            </tva:ProgramLocationTable>
    <tva:ProgramReviewTable>
     <tva:Review
programId="CRID://www.keti.re.kr:drama/wanggun">
        <tva:FreeTextReview> Korean historical drama
                            </tva:FreeTextReview>
     </tva:Review>
    </tva:ProgramReviewTable>

</tva:ProgramDescription>
  </tva:TVAMain>
  <tns:InvalidFragments/>
</tns:get_Data_Result>
```

[FIG. 10]

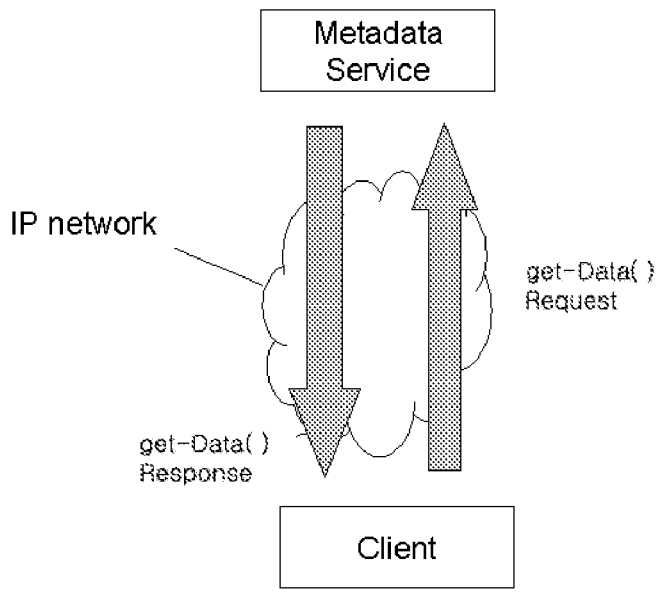

[FIG. 11]

```
<complexType name="RequestedFieldsType">
  <sequence>
    <element name="RequestedField" minOccurs="0" maxOccurs="unbounded">
      <complexType>
        <sequence>
          <element name="SortCriteria" type="tns:SortCriteriaType" minOccurs="0" maxOccurs="unbounded"/>
        </sequence>
        <attribute name="fieldID" type="tns:fieldIDType" use="required"/>
      </complexType>
    </element>

<element name="RequestedXPath" minOccurs="0" maxOccurs="unbounded">
      <complexType>
        <sequence>
          <element name="SortCriteria" type="tns:SortCriteriaType" minOccurs="0" maxOccurs="unbounded"/>
        </sequence>
        <attribute name="XPath" type="string" use="required"/>
      </complexType>
    </element>
  </sequence>
</complexType>
```

[FIG. 12]

```
<complexType name="RequestedTablesType">
    <sequence>
        <element name="Table" maxOccurs="unbounded">
          <complexType>
        <sequence>
          <element name="RequestedFields" type="tns:RequestedFieldstype" minOccurs="0" maxOccurs="unbounded"/>
             <element name="SortCriteria" type="tns:SortCriteriaType"
                      minOccurs="0" maxOccurs="unbounded"/>
          </sequence>
          <attribute name="type" use="required">
             <simpleType>
                <restriction base="string">
                   <enumeration value="ContentReferencingTable"/>
                   <enumeration value="ClassificationSchemeTable"/>
                   <enumeration value="ProgramInformationTable"/>
                   <enumeration value="GroupInformationTable"/>
                   <enumeration value="CreditsInformationTable"/>
                   <enumeration value="ProgramLocationTable"/>
                   <enumeration value="ServiceInformationTable"/>
                   <enumeration value="ProgramReviewTable"/>
                   <enumeration value="SegmentInformationTable"/>
                </restriction>
             </simpleType>
          </attribute>
       </complexType>
    </element>
 </sequence>
</complexType>
```

[FIG. 13]
```
<get_Data>
        <QueryConstraints>
        <PredicateBag>
                <BinaryPredicate fieldID="tvaf:ServiceURL" fieldValue="tv://7"/>
                </PredicateBag>
        </QueryConstraints>
        <RequestedTables>
                <Table type="ProgramInformationTable">
                        <RequestedFields>
                                <RequestedField fieldID="tvaf:CRID"/>
                                <RequestedField fieldID="tvaf:Genre"/>
                        </RequestedFields>
                </Table>
                <Table type="ProgramLocationTable">
                        <RequestedFields>
                                <RequestedField fieldID="tvaf:ProgramURL"/>
                        </RequestedFields>
                </Table>
        </RequestedTables>
</get_Data>
```

[FIG. 14]

```
<complexType name="FieldListType">
  <sequence>
   <element name="IdentificationByFieldId" minOccurs="0"
maxOccurs="unbounded">
     <complexType>
       <attribute name="fieldID" type="tns:fieldIDType" use="required"/>
     </complexType>
   </element>
   <element name="IdentificationByXPath" minOccurs="0"
maxOccurs="unbounded">
     <complexType>
        <attribute name="XPath" type="string" use="required"/>
     </complexType>
   </element>
  </sequence>
</complexType>
```

[FIG. 15]

```
  <complexType name="RequestedTablesType">
    <sequence>
     <element name="Table" maxOccurs="unbounded">
      <complexType>
       <sequence>
      <element name="RequestedFields" type="tns:FieldListType"
        minOccurs="0"/>
         <element name="SortCriteria" type="tns:SortCriteriaType"
         minOccurs="0" maxOccurs="unbounded"/>
       </sequence>
       <attribute name="type" use="required">
         <simpleType>
          <restriction base="string">
            <enumeration value="ContentReferencingTable"/>
            <enumeration value="ClassificationSchemeTable"/>
            <enumeration value="ProgramInformationTable"/>
            <enumeration value="GroupInformationTable"/>
            <enumeration value="CreditsInformationTable"/>
            <enumeration value="ProgramLocationTable"/>
            <enumeration value="ServiceInformationTable"/>
            <enumeration value="ProgramReviewTable"/>
            <enumeration value="SegmentInformationTable"/>
          </restriction>
         </simpleType>
       </attribute>
      </complexType>
     </element>
    </sequence>
  </complexType>
```

[FIG. 16]

```
<element name="get_Data" type="tns:get_DataType"/>
  <complexType name="get_DataType">
    <sequence>
      <element name="ResourceID" minOccurs="0"/>
      <element name="QueryConstraints">
        <complexType>
          <choice>
            <element name="PredicateBag" type="tns:PredicateBagType"/>
            <element name="BinaryPredicate" type="tns:BinaryPredicateType"/>
            <element name="UnaryPredicate" type="tns:UnaryPredicateType"/>
          </choice>
        </complexType>
      </element>
      <element name="PersonalInformation" type="tva2:ExtendedUserDescriptionType"
          minOccurs="0"/>
      <element name="RequestedTables" type="tns:RequestedTablesType"/>
    </sequence>
    <attribute name="maxPrograms" type="unsignedInt"/>
    <attribute name="personalInfoUse" type="boolean" default="true"/>
```

METHOD FOR PROVIDING REQUESTED FIELDS BY GET_DATA OPERATION IN TV-ANYTIME METADATA SERVICE

RELATED APPLICATIONS

This is a Division of application Ser. No. 11/192,057 filed Jul. 29, 2005. The present disclosure relates to subject matter contained in priority Korean Application Nos. 10-2004-0074548, filed on 17 Sep. 2004 and 10-2005-0025885, filed on 29 Mar. 2005, which are herein expressly incorporated by reference in its entirety.

BACKGROUND OF THE INVENTION

1. Field of the Invention

The present invention relates, in general, to a TV-Anytime service and, more particularly, to a method for providing requested fields by get_Data operation in TV-Anytime metadata service.

2. Description of the Related Art

Recently, as a digital broadcasting service has become popularized, research into technology for providing a customized broadcasting service in a multichannel multimedia environment has been actively carried out. For example, TV-Anytime, which is a nonofficial international standard, is a standard for providing an anytime service of allowing a user to match his or her preferences with metadata on the basis of the metadata including description information of contents, to store desired contents, and to freely watch desired broadcast contents at any time.

As described above, metadata, which is description information about contents, includes content-based description information defined in Moving Picture Experts Group (MPEG)-7 and Electronic Program Guide (EPG) information in TV-Anytime service, and allows a user to easily search for and select desired contents. The metadata standard is composed of two parts. Part A defines a format for representing metadata, that is, a schema, and utilizes eXtensible Markup Language (XML)-based MPEG-7 Description Definition Language (DDL) [International Organization for Standardization (ISO)/International Electrotechnical Commission (IEC) 15938-2]. Part B relates to the transmission of metadata and includes a binary format (MPEG-7 BiM: Binary Format for MPEG-7) (ISO/IEC 15938-1), a fragmentation model, an encapsulation mode and an indexing method.

FIG. 1 is a view showing the configuration of TV-Anytime metadata, which includes program description metadata and user description metadata. The program description metadata includes content description metadata and instance description metadata. Metadata for a single program are interrelated via a content identifier called a Content Reference Identifier (hereinafter referred to as a "GRID").

Content description metadata is created by a content creator and includes a program title, genre, summary, critic's reviews, etc. Instance description metadata is created by a content provider and includes location [broadcast time, channel, Uniform Resource Locator (URL), etc.], usage rule, delivery parameter, etc. User description metadata includes user preference, usage history, personal bookmarks, etc., and is created by a user.

TV-Anytime standards define two-types of metadata Web services for bi-directional metadata services using a return path: one is a well-defined behavior and the other is a remote procedure for an input/output set. In eXtensible Markup Language (XML)-based Web Service Description Language (WSDL) standards, the above-described remote procedure is defined in the form of a Simple Object Access Protocol (hereinafter referred to as "SOAP") operation, and includes a "get_Data" operation used to search for metadata and a "submit_Data" operation used for user description submission. For reference, the above-described SOAP is an XML-based communication protocol enabling access to an object in a distribution environment.

Request/response types used in the TV-Anytime metadata service are defined in a namespace of "urn:tva:transport: 2002", which is provided as a tool for verifying a variety of messages. Types defined in metadata specification and content referencing standards are referred to in a transport namespace. Schema fragments are defined by the above-described namespace, and a namespace provider is defined in the form of "tns:" in the schema fragments. A perfect XML schema file has a form of tva_transport_types_v10.xsd.

1. Get_Data Operation

The get_Data operation provides a function of allowing a client to search a server for TV-Anytime data about a program or a program group. Functions that can be provided by a TV-Anytime metadata provider using the get_Data operation are exemplified by the following description.

return content reference data for CRID using CRID list
    return TV-Anytime metadata for CRID using CRID list
    receive query for specific metadata attributes (for example, genre, actor, etc.) and return programs corresponding to the query
    return corresponding programs in response to a query for a specific time or specific channel Referring to FIG. 2 in relation to the execution of a get_Data operation, a client transmits a SOAP request message [i.e. get_Data Request element of FIG. 3] using the get_Data operation to a metadata service server through the Internet [Internet Protocol (IP) network]. At this time, the get_Data operation supports all types of queries as a rule, and provides extensive queries for metadata constraints. Then, the metadata service server returns a query result value corresponding to the SOAP request message using a SOAP response message [get_Data Response element of FIG. 5].

a. Request Format

As shown in FIG. 3, a request format assigns three types of parameters to a client in the get_Data operation, and assigns an element type, returned as a query (search) result value, to the type of RequestedTables.

FIG. 4 shows an example in which the RequestedTables type, returned as a query result, is assigned to Classification-Schemetable, ProgramInformationTable, Groupinforma-tionTable, CreditsInformationTable, ProgramLocationTable, ServiceInformationTable, ProgramReviewTable, SegmentInformationTable, etc.

b. Response Format

As shown in FIG. 5, the response format of the get_Data operation includes 0 or at least one XML instance documents with respect to elements, such as, TVAMain, ContentReferencingTable, and InvalidFragments, and returns a query result value according to the type of RequestedTables requested in the request format.

2. Submit_Data Operation

In TV-Anytime's phase I standard, the submit_Data operation is limited to data defined by a set of anonymous profile data created by intelligent agents based on a usage service and contents or by manual input. A TV-Anytime forum respects and includes basic rights of all users and providers, and includes private rights of content users and legal rights of all participators, such as content creators, content providers and service providers.

3. Get_Data Operation Using User Information

In a current TV-Anytime service, service agents perform a get_Data operation using algorithms specific for each agent on the basis of user metadata transmitted through the submit_Data operation, and transmit corresponding results to users.

As described above, a get_Data operation, currently defined in TV-Anytime SP006 returns results obtained from a desired table or an element TVAMain through a search operation. That is, the search results for the get_Data operation are transmitted on an element "TVAMain" basis or on a table basis, such as "ProgramInformationTable", "GroupInformationTable", "ProgramLocationTable", "ServiceInformationTable", "CreditsInformationTable", "ProgramReviewTable", or "SegmentInformationTable".

In the meantime, a set-top box can search for contents and can be provided with corresponding metadata using the get_Data operation in a bi-directional environment. However, as the set-top box has been developed into a home server, it can function as a metadata service agent in the home. In a terminal using limited resources, such as a portable media player, the provision of conventional table-based metadata may waste resources.

For example, if a query is performed using the conventional get_Data operation when it is assumed that metadata provided by a portable media player to a user environment are title, genre, location information and review information, ProgramInformationTable, ProgramLocationTable and ProgramReviewTable are requested as the values of RequestedTables, and the values of corresponding elements or attributes are parsed and then displayed on a User Interface (UI). Therefore, due to unnecessary metadata in respective tables, network resources transmitting the unnecessary metadata and resources used in the parsing operation of the portable media player are wasted.

Further, the search for the conventional get_Data operation performed on a table basis is problematic in that resources are wasted due to the transmission of unnecessary metadata and reparsing performed by a client when the client does not require all of the metadata in a table.

SUMMARY OF THE INVENTION

Accordingly, the present invention has been made keeping in mind the above problems occurring in the prior art, and an object of the present invention is to provide a method for providing a personalized TV-Anytime metadata service, which can request return result values on a field basis in a modified get_Data operation to provide a personalized service, thus selectively returning a client's desired metadata.

In accordance with a first aspect of the present invention, there is provided a method of providing a TV-Anytime metadata service using a Simple Object Access Protocol (SOAP) query operation, comprising the steps of a) including a requested fields type element (RequestedFieldsType), required to designate a field of a metadata table, in a query result value type in the SOAP query operation, b) receiving a request message of the SOAP query operation, and c) when the request message includes the requested fields type element designated as the query result value, extracting a query result value corresponding to the designated table field from the requested fields type element included in the request message, and transmitting the query result value using a response message of the SOAP operation.

Preferably, the SOAP query operation may be a get_Data operation, and the requested fields type element included at step a) may comprise a requested field sub-element for designating a field ID (fieldID) of the metadata table, and a requested path sub-element for designating a path (Xpath) of the field ID (fieldID).

Preferably, the step c) may be performed so that, if duplicated data having the same field ID (fieldID) exist in the query result value, the duplicated data are removed from the query result value, and the metadata may be program description metadata.

In accordance with a second aspect of the present invention, there is provided a method of providing a TV-Anytime metadata service, the method providing a search on a field basis of a table using a get_Data operation in the TV-Anytime metadata service, comprising the steps of d) including, as a sub-element, a requested field element (RequestedFields) for designating a field of a table, in a requested table element (RequestedTables) as a query result value of the get_Data operation; e) receiving a request message of the get_Data operation; f) extracting a field designated in the requested field element from the table designated in the requested table element as a query result value in response to reception of the request message; and g) transmitting the extracted query result value using a response message of the get_Data operation.

BRIEF DESCRIPTION OF THE DRAWINGS

FIG. 1 is a view showing the configuration of TV-Anytime metadata;

FIG. 2 is a conceptual view showing the typical execution of a get_Data operation;

FIG. 3 is a view showing the request format of a conventional get_Data operation;

FIG. 4 is a view showing an example of the type of RequestedTables returned as the results of a query in the conventional get_Data operation;

FIG. 5 is a view showing the response format of the conventional get_Data operation;

FIG. 6 is a view showing an example of RequestedFieldsType for requesting the results of a query in a get_Data operation according to a first embodiment of the present invention;

FIG. 7 is a view showing the request format of a get_Data operation according to the first embodiment of the present invention;

FIG. 8 is a view showing an example of a query instance of the get_Data operation according to the first embodiment of the present invention;

FIGS. 9a and 9b is a view showing an example of a response instance of the get_Data operation according to the first embodiment of the present invention;

FIG. 10 is a conceptual view showing the execution of the get_Data operation according to the first embodiment of the present invention;

FIG. 11 is a view showing an example of the RequestedFieldsType according to a second embodiment of the present invention;

FIG. 12 is a view showing an example of RequestedTablesType in which the RequestedFieldsType element of FIG. 11 is included as a sub-element;

FIG. 13 is a view showing an exemplary instance of a get_Data operation for requesting an element RequestedTables of the RequestedTablesType defined in FIG. 12;

FIG. 14 to FIG. 16 are views showing an example of FieldListType modified from the RequestedFieldsType, the RequestedTablesType and the get_Data operation using thereof, respectively.

DESCRIPTION OF THE PREFERRED EMBODIMENTS

Hereinafter, embodiments of the present invention will be described in detail with reference to the attached drawings.

FIG. 6 is a view defining a requested fields type (hereinafter referred to as a "RequestedFieldsType") for requesting query results on a specific element or attribute basis in a modified get_Data operation, that is, a get_Data operation, according to a first embodiment of the present invention.

In FIG. 6, the RequestedFieldsType may additionally include two elements, that is, RequestedField and RequestedXPath, as sub-elements. In each of the elements, minOccurs="0" and maxOccurs="unbounded" are designated, so that an infinite number (greater than or equal to 0) of queries for the RequestedField and RequestedXPath are possible.

The RequestedField has SortCriteria as a sub-element. The SortCriteria denotes sort criteria for query results, follows an existing sort method and has fieldID as an attribute. The value of the fieldID denotes an ID of a field to be retrieved as query results, and uses fieldIDType currently defined in the TV-Anytime standards.

At the time of query using the RequestedField, a problem may occur because a plurality of Xpaths may exist in a single fieldID. In this case, a service agent of a metadata server can transmit all duplicated data or remove the duplicated data, and can selectively transmit the duplicated data according to the policy of the service agent in the case of the same TVA-Main instance. The transmission of the duplicated fieldID complies with the policy of a service provider.

In order to prevent the vagueness of the policy of the service provider, a user can request a query using RequestedXPath. That is, the RequestedXPath can designate a definite path (XPath) of a desired field to be requested according to the grammar of XPath. Similar to the above-described RequestedField, the RequestedXPath has SortCriteria as a sub-element and has XPath as an attribute, so that a value to be queried can be set to the value (type) of the attribute XPath.

FIG. 7 is a view showing the request format of the get_Data operation modified to use the above-described RequestedFieldsType.

Referring to FIG. 7, element RequestedFields is added after element RequestedTables as a query result value. The RequestedFields uses the RequestedFieldsType of FIG. 6, and may use the above-described elements RequestedField and RequestedXPath.

Next, an example of an instance of performing a query using the above-described get_Data operation is described. As shown in FIG. 8, a user (or client) requests (queries) a part in which fieldID is "tvaf:ServiceURL" and the value thereof is "tv://7" or "tv://9" in the RequestedField. Further, for the type of query result value, the RequestedTables is assigned to "ProgramLocation Table", and the fieldID of the RequestedFields is assigned to "tvaf:CRID", "tvaf:Genre", "tvaf:Title", "tvaf:ProgramURL", "tvaf:PublishedStart", and "tvaf:PublishedDuration". Further, RequestedXPath is assigned to "/TVAMain/ProgramDescription/ProgramReviewTable/Review/FreeTex tReview/text".

FIGS. 9a and 9b is a view showing an example of a response instance to the query instance of FIG. 8. That is, FIGS. 9a and 9b shows that a search result value, in which fieldID is "tvaf: CRID", "tvaf: Genre", "tvaf: Title", "tvaf: ProgramURL", "tvaf: PublishedStart" and "tvaf: PublishedDuration" and RequestedXPath is "/TVAMain/ProgramDescription/ProgramReviewTable/Review/FreeTex tReview/text", is extracted from the ProgramInformationTable according to the search conditions of FIG. 8, and is returned.

Referring to FIG. 10 in relation to the execution of a get_Data operation, a client transmits a SOAP request message [get_Data Request element] using the get_Data operation to a metadata service server through the Internet (IP network) in a TV-Anytime service. When the request message includes a requested fields type element of a metadata table designated as a query result value, the metadata service server extracts a query result value corresponding to the table field designated from the requested fields type element. Then, the metadata service server returns a query result value corresponding to the SOAP request message using a SOAP response message [get_Data Response element].

As described above, according to the first embodiment of the present invention, returned result values may be requested on a field basis in the get_Data operation, thus selectively returning the client's desired metadata. That is, the client of the metadata service can receive metadata query results on a table basis and/or on a field basis, so that the user can selectively receive only his or her desired metadata, thus remarkably decreasing the transmission of metadata and the burden on the client caused by reparsing. Further, the present invention can realize the above-described advantage even in a typical set-top box environment, and can be more profitably used in a client environment having limited processing resources.

In the meantime, according to the first embodiment of the present invention, in order to process the metadata on a field basis according to the request from the client, additional processing may be required in the server, but the processing time of the client can be more remarkably reduced by the present invention if the fact that a service agent is in a high capacity environment compared to a client environment is taken into consideration.

FIG. 11 is a view defining a requested fields type RequestedFieldsType for designating a specific element and an attribute value according to a second embodiment of the present invention.

As shown in FIG. 11, the RequestedFieldsType includes two elements, that is, a unit requested field element RequestedField and a requested path element RequestedXPath. The RequestedFieldsType may be included in a requested table type RequestedTablesType as a sub-element.

In the above-described RequestedField and RequestedXPath, minOccurs="0" and maxOccurs="unbounded" are designated, so an infinite number (greater than or equal to 0) of queries for the RequestedField and RequestedXPath are possible.

The RequestedField includes SortCriteria as a sub-element. The SortCriteria denotes sort criteria for query results, which comply with a conventional sort method. Further, the RequestedField designates a field ID fieldID as an attribute. The value of the fieldID is an ID of a field to be retrieved as query results. The fieldID uses a field ID type fieldIDType currently defined in the TV-Anytime standards.

In the meantime, at the time of query using the RequestedField, a problem may occur because a plurality of Xpaths may exist in a single fieldID. In this case, a service agent of a metadata server can transmit all duplicated data or remove the duplicated data, and can selectively transmit the duplicated data according to the policy of the service agent in the case of the same TVAMain instance. The transmission of the duplicated fieldID complies with the policy of a service provider.

If a query is performed using the above-described RequestedXPath, the vagueness of the policy of the service provider can be prevented. That is, the RequestedXPath can designate a definite path (XPath) of a desired field to be requested according to the grammar of the XPath. Similar to the above-described RequestedField, the RequestedXPath has SortCriteria as a sub-element and has XPath as an attribute. Therefore, a value to be queried can be set to the value (type) of the attribute XPath.

FIG. 12 is a view defining a requested tables type RequestedTablesType in which the element of the above-described RequestedFieldsType, that is, RequestedFields, is included as a sub-element. Accordingly, return values can be requested on a field basis of a desired requested table as the query results of a get_Data operation.

As shown in FIG. 12, the RequestedFields is the sub-element of the RequestedTablesType, so an infinite number (greater than or equal to 0) of queries for the requested field element RequestedFields are possible with respect to a single requested table.

FIG. 13 is a view showing an example of an instance of the get_Data operation for requesting an element RequestedTables of the RequestedTablesType defined in FIG. 12 as a return value.

As shown in FIG. 13, the element RequestedTables includes requested field element RequestedFields with respect to each of "ProgramInformation Table" and "ProgramLocation Table". Further, the requested field element for the "ProgramInformation Table" includes two unit requested fields to which field IDs fieldID are assigned as attributes and which request "tvaf: CRID" and "tvaf: Genre" as return values. Further, the requested field element RequestedFields of the "ProgramLocation Table" includes a unit requested field to which "tvaf: ProgramURL" is assigned as an attribute and which requests the return of a corresponding field. Accordingly, the service agent, having received the query of FIG. 7, selectively searches the "ProgramInformation Table" and the "ProgramLocation Table" only for fields requested by a client, and can return the search results.

FIG. 14 to FIG. 16 are views showing an example of FieldListType modified from the RequestedFieldsType, the RequestedTablesType and the get_Data operation using thereof, respectively. As shown, the element FieldListType may be used like the element RequestedFieldsType, just by changing the name therefrom. In such a case, the names of the elements, RequestedField and RequestedXPath, may be changed to IdentificationByFieldId and IdentificationByXPath, Respectively. Further, when the FieldListType is used, an element SortCriteria of the RequestedFieldType may be no longer necessary.

As described above, according to the second embodiment of the present invention, the element of the RequestedFieldsType is added as the sub-element of the RequestedTables, so that a unit requested field element having an ID of a specific field (FieldID) as an attribute can be designated without changing the get_Data operation. Accordingly, there is an advantage in that a client can request a return result value on a field basis of a requested table and selectively receive desired metadata.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing a TV-Anytime metadata service, the method comprising:

a) including an identifier of a requested field among a plurality of fields of a metadata table in a request message of a get_Data operation in the TV-Anytime service according to a Simple Object Access Protocol;

b) receiving the request message;

c) in response to the request message, searching for the requested field and extracting a value of the requested field from the metadata table as a query result value, by using the identifier of the field; and d) transmitting the query result value using a response message of the get_Data operation, wherein the query result value comprises the value of the requested field of the metadata table, but does not include a value of another field among the plurality of fields of which an identifier is not included in the request message, and wherein the requested field element comprises:

a unit requested field element, which designates an ID of a field to be searched for, as a sub-element, and a requested path element for designating a path of a field to be searched for, as a sub-element.

2. The method according to claim 1, wherein the identifier of the field comprises an attribute of the field.

3. The method according to claim 1, wherein the path of the field is an Xpath of an Extensible Markup Language-based communication protocol.

4. The method according to claim 1, wherein the request message comprises:

```
<complexType name="RequestedFieldsType">
  <sequence>
    <element name="RequestedField" minOccurs="0" maxOccurs="unbounded">
      <complexType>
        <sequence>
          <element name="SortCriteria" type="tns:SortCriteriaType" minOccurs="0" maxOccurs="unbounded"/>
        </sequence>
        <attribute name="fieldID" type="tns:fieldIDType" use="required"/>
      </complexType>
    </element>
    <element name="RequestedXPath" minOccurs="0" maxOccurs="unbounded">
      <complexType>
        <sequence>
          <element name="SortCriteria" type="tns:SortCriteriaType" minOccurs="0" maxOccurs="unbounded"/>
        </sequence>
        <attribute name="XPath" type="string" use="required"/>
      </complexType>
    </element>
  </sequence>
</complexType>.
```

* * * * *